United States Patent [19]

Eisenloeffel

[11] Patent Number: 4,694,598

[45] Date of Patent: Sep. 22, 1987

[54] COMPRESSION CLAMP FOR A PICTURE FRAME

[75] Inventor: Helmut Eisenloeffel, North Royalton, Ohio

[73] Assignee: Valco/Valley Tool & Die, Inc., North Royalton, Ohio

[21] Appl. No.: 898,636

[22] Filed: Aug. 21, 1986

[51] Int. Cl.⁴ .............................................. G09F 1/12
[52] U.S. Cl. .................................... 40/155; 403/402; 403/295
[58] Field of Search ............... 403/401, 402, 297, 292, 403/295; 40/155

[56] References Cited

U.S. PATENT DOCUMENTS 4,377,915  3/1983  Zossimas et al. ...................... 40/155
4,538,936  9/1985  Zeidl ................................ 403/297 X

FOREIGN PATENT DOCUMENTS 2204646  8/1973  Fed. Rep. of Germany ...... 403/401
1175966  11/1958  France ............................ 403/297
7811946  6/1980  Netherlands ...................... 403/297

Primary Examiner—Andrew V. Kundrat
Attorney, Agent, or Firm—Harlan E. Hummer

[57] ABSTRACT

A clamping device is described as being a flat plate with depending flanges or arms which extend, firstly, from opposing marginal edges of the plate in a direction normal to the plane of the plate and, secondly, towards each other in a plane parallel to the plane of the plate and, lastly, terminate at free distal ends which converge towards each other in the direction of an opening in the plate, which opening threadably receives a screw which, when rotated into contact with the distal ends, causes expanded movement of the plate and arms into compressive relation with adjacent walls of a channel in which the device is employed as a fastening mechanism.

3 Claims, 4 Drawing Figures

COMPRESSION CLAMP FOR A PICTURE FRAME

BACKGROUND OF INVENTION

The invention relates to picture frames, especially to a clamping device which is used to reinforce and hold together the mitered corners of a metal picture frame that has a rearwardly facing slot or channel which extends longitudinally of each of the framing members of which the picture frame is made.

At present, one or more rigid, L-shaped, flat metal plates with set screws are used to reinforce and clamp together the mitered corners of adjacent picture framing members. Such plates are stamped and relatively expensive to manufacture. Further, the flatness of these plates provide limited frictional engagement with the framing members. The invention is designed to provide an improved clamping device which provides greater surface contact of the device with the framing members as well as an unusual mechanism for operating the device.

SUMMARY OF INVENTION

Briefly stated, the invention is in a clamping device which comprises at least one flat plate which has an opening for threadedly receiving a screw and a pair of resilient arms which extend from the plate towards the bottom wall of the channel and then are reversely bent and terminate at a pair of free distal ends which converge towards, and terminate in spaced relation adjacent, the opening, such that the screw, when rotated towards the bottom wall, will engage the ends and force them apart and away from the opening to move the plates and arms into compressive engagement with the channel walls to lock the plate firmly within the channel.

DESCRIPTION OF DRAWING

The following description of the invention will be better understood by having reference to the accompanying drawing, wherein.

ENVIRONMENT OF INVENTION

Figure 1:
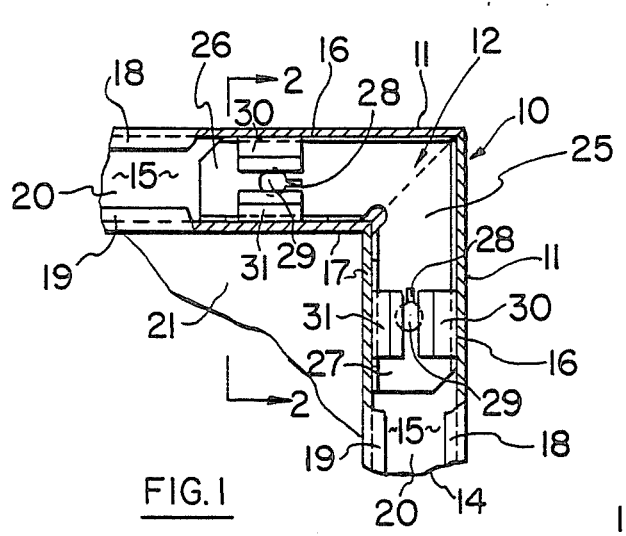
FIG. 1 is plan view of a mitered corner of a picture frame, portions of the frame being removed to show the clamping device which is made in accordance with the invention.
Figure 2:
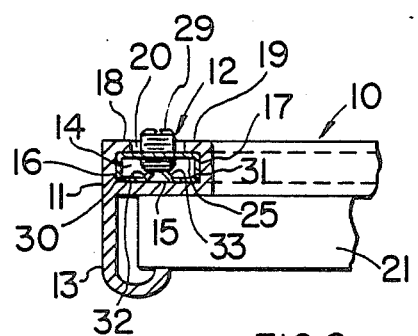
FIG. 2 is a section viewed from the plane 2—2 of FIG. 1.

With general reference to the drawing for like parts and particular reference to FIGS. 1 and 2, there is shown a metal picture frame 10 which is composed of four identical framing members, e.g. member 11, which are held in mitered, rectangular relation by means of a clamping device 12 in each corner of the picture frame 10.

Each framing member 11 comprises a J-shaped side and front portion 13 with a rearwardly facing channel 14 which is defined by, (I) a flat bottom wall 15, (II) a pair of opposing, parallel sidewalls 16, 17, extending from the botton wall 15, and (III) a pair of planar flanges 18, 19 which are parallel to the bottom wall 15 and have an opening 20 between them. Thus, is formed a picture frame 10 for which any suitable picture 21 is mounted.

THE INVENTION

The clamping device 12, shown in FIGS. 1 and 2, comprises a rigid, L-shaped reinforcement plate 25 which includes a pair of flat legs 26, 27 that are at right angles to each other. An opening 28 for threadably receiving a threaded screw 29 is provided in each of the legs 26, 27. Extending towards the bottom wall 15 from opposing marginal edges of each of the legs 26, 27, and from opposite sides of the opening 28, is a pair of flanges or arms 30, 31 which extend along the sidewalls 16, 17, and then for a short distance along the bottom wall 15, and then terminate at free distal ends 32, 33 which converge towards each other in the direction of the adjacent opening 28. It can be appreciated that the screw 29 will engage the distal ends 32, 33 and force them apart and in the direction of the bottom wall 15 to literally cause expanded movement of the arms 30, 31 and attached legs 26, 27 into tight compressive engagement with the adjacent bottom wall 15, sidewalls 16, 17, and flanges 18, 19, of the channels 14 to produce a highly improved compression-type interlocking fastener which is released by reversing rotation of the screw 29 to cause the resilient arms 30, 31 to spring back to their normal rest positions where they do not compressively engage the surrounding parts of the channel 14.

Figure 3:
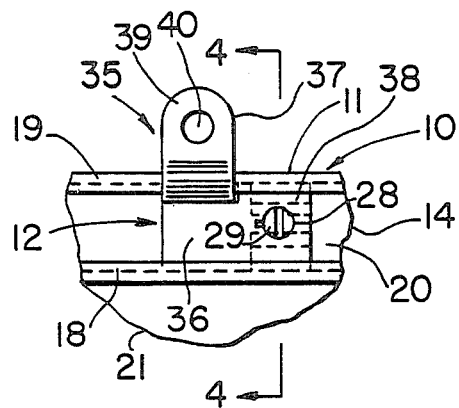
FIG. 3 is a plan view of a portion of a picture frame showing another embodiment of the invention.
Figure 4:
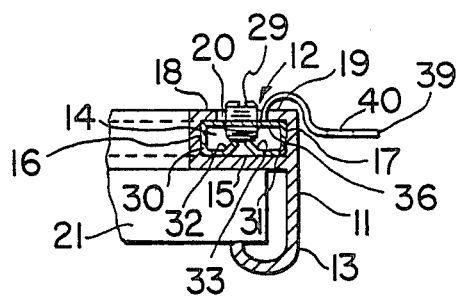
FIG. 4 is a section viewed from the plane 4—4 of Fig. 3

With particular reference to FIGS. 3 and 4, it can be seen how easily the inventive concept can be adapted to a picture frame holder 35 that utilizes a single flat leg 36 with the resilient, expansible arms 30, 31 of the previously described flat legs 26, 27. A hanger 37 extends from one side 38 of the leg 36 in opposed relation from the closest arm 31 and is curved to partially wrap around and engage the adjacent flange 19. The hanger 37 extends beyond the flange 19 and terminates at a free distal end 39 which has an opening 40 that is designed to receive any suitable device by which the picture frame 10 is mounted on a flat, vertical surface such as a wall.

Thus, there has been described a unique clamping or fastening device which employs a pair of resilient arms which are forced to expand into compressive engagement with surrounding walls of a channel in which the arms and attached flat plate are positioned, The device is economically formed of lightweight spring steel, contrary to some known fasteners which are cast from heavier gauge metals. The invention provides increased surface contact between the clamping device and surrounding environment. Such contact provides a rigid and highly stabilized juncture of the clamping device with the surrounding structure.

What is claimed is:

1. A clamping device for attaching a first member to a second member which has a longtudinally extending channel with a rectangular cross-section which is defined by a flat bottom wall, a pair of sidewalls extending from the bottom wall in parallel relation, and a pair of flanges which extend from the sidewalls in aligned parallel relation with the bottom wall and which terminate in spaced relation to form an opening between them, the device comprising:
   (a) at least one flat plate which is designed to rest in close proximity to the flanges, the plate having at least one opening therein, the opening being located between the flanges;
   (b) a screw threadably received in the opening and rotatable therein to and from the bottom wall of the channel, the screw having a flat distal end within the channel closest the bottom wall, the screw having a diameter which is at least as large as the diameter of the opening;

(c) a pair of resilient arms extending from opposing marginal edges of the plate on opposite sides of the opening, the arms extending along the adjacent sidewalls and then towards each other partially along the bottom wall and then terminating at distal ends which converge towards each other in the direction of the opening and terminate in closely spaced relation to engage the flat end of the screw, the spacing between the distal ends of the arms being less than the diameter of the screw to prevent the screw from passing between them;

the screw, when rotated towards the bottom wall, designed to engage the distal ends of the arms and force them apart and towards the bottom wall to move the arms and attached plate into compressive engagement with at least the bottom wall and flanges of the channel.

2. The clamping device of claim 1, which is used in connection with a picture frame which is formed of four framing members with longitudinally extending channels and which are clamped together in mitered relation by a clamping device in each mitered corner, each device including:

(d) a similar second flat plate extending from the at least one flat plate at right angles, the second plate also having an opening therein;

(e) a similar screw threadably received in the opening of the second plate and rotatable therein to and from the adjacent bottom wall;

(f) a similar pair of resilient arms extending from opposing marginal edges of the second plate on opposite sides of the opening therein, the arms extending along the adjacent sidewalls and then towards each other partially along the adjacent bottom wall and then terminating at distal ends which converge towards each other in the direction of the opening in the second plate.

3. A clamping device for attaching a first member to a second member which has a channel with a rectangular cross-section which is defined by a bottom wall, a pair of sidewalls extending from the bottom wall, and a pair of flanges which extand from the sidewalls in parallel relation with the bottom wall and which have an opening between them, the device comprising:

(a) at least one flat plate which is designed to rest in close proximity to the flanges, the plate having at least one opening therein, the opening being located between the flanges;

(b) a screw threadably received in the opening and rotatable therein to and from the bottom wall of the channel;

(c) a pair of resilient arms extending from opposing marginal edges of the plate on opposite sides of the opening, the arms extending along the adjacent sidewalls and then towards each other partially along the bottom wall and then terminating at distal ends which converge towards each other in the direction of the opening; the screw, when rotated towards the bottom wall, designed to engage the distal ends of the arms and force them towards the bottom wall to move the arms and attached plate into compressive engagement with the bottom wall, sidewalls, and flanges of the channel; and (d) a hanger extending from the plate in opposed relation to the arms, the hanger being curved to partially wraparound and engage an adjacent flange and terminating at a distal end which extends further from the plate and flange and has an opening therein.

* * * * *